Jan. 23, 1962 C. T. BLAKE ET AL 3,018,115
TOGGLE ACTUATED CHUCK

Filed Feb. 1, 1960 6 Sheets-Sheet 1

INVENTORS
CHARLES T. BLAKE
RUDOLF VETSCH
BY Hudson, Boughton,
Williams, David & Hoffmann
ATTORNEYS INVENTORS
CHARLES T. BLAKE
RUDOLF VETSCH
BY Hudson, Boughton,
Williams, David & Hoffman
ATTORNEYS Jan. 23, 1962 C. T. BLAKE ET AL 3,018,115
TOGGLE ACTUATED CHUCK Filed Feb. 1, 1960 6 Sheets-Sheet 4

INVENTORS
CHARLES T. BLAKE
RUDOLF VETSCH
BY Hudson, Doughton,
Williams, David & Hoffmann
ATTORNEYS Jan. 23, 1962  C. T. BLAKE ET AL  3,018,115
TOGGLE ACTUATED CHUCK
Filed Feb. 1, 1960  6 Sheets-Sheet 5
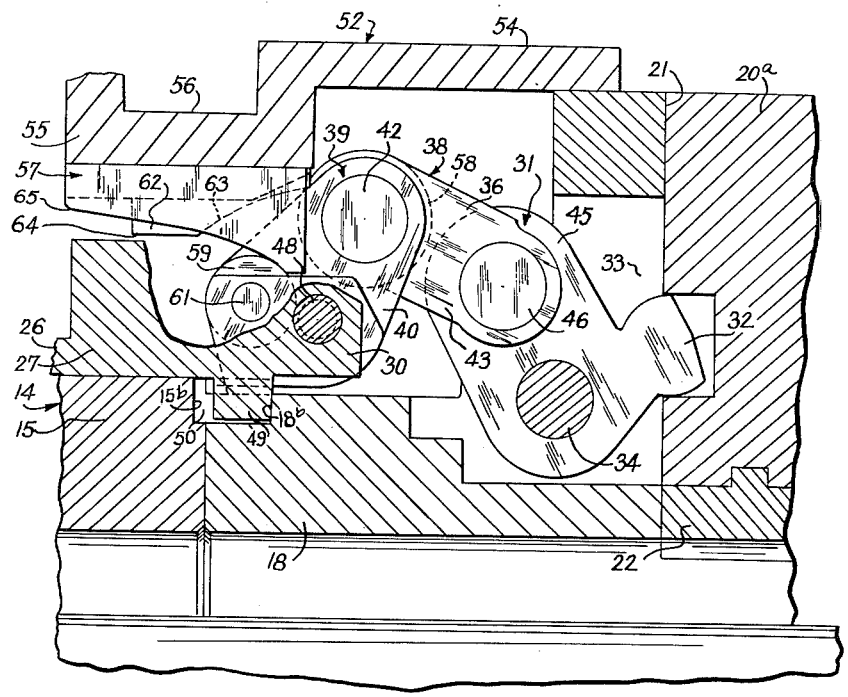
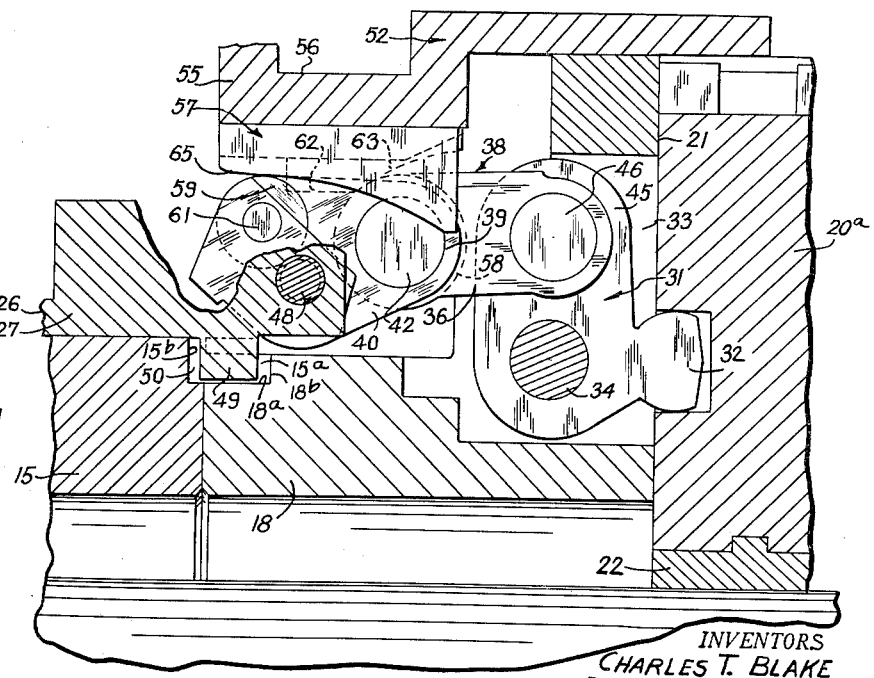
INVENTORS
CHARLES T. BLAKE
RUDOLF VETSCH
BY Hudson, Boughton,
Williams, David & Hoffmann
ATTORNEYS United States Patent Office 3,018,115
Patented Jan. 23, 1962

3,018,115
TOGGLE ACTUATED CHUCK
Charles T. Blake, Shaker Heights, and Rudolf Vetsch, Walton Hills, Ohio, assignors to The Warner & Swasey Company, Cleveland, Ohio, a corporation of Ohio
Filed Feb. 1, 1960, Ser. No. 5,908
15 Claims. (Cl. 279—118)

The present invention relates to lever-actuated jaw work chucks for machine tool spindles.

The present invention relates to the type of work-holding chuck which comprises an annular member adapted to be secured to one end of a machine tool spindle and having a plurality of work-gripping jaws supported by the annular member for radial movement between a work-gripping position and a work-releasing position. The work-gripping elements are normally spring biased to one of their positions, usually to their work-gripping, or chuck-closed, position, and are operated to their other position in opposition to the action of the spring bias by a power actuator, for example, a hydraulic-piston cylinder actuator. In known mechanisms, an annular slide ring is actuated by the power actuator to move a cam that operates to effect movement of the work-gripping elements in opposition to the spring when the ring is moved in one direction, and when the ring is moved in its other direction, allows the spring to move the work-gripping elements to their other position. With the known mechanisms, problems are encountered when the slide ring is operated to permit the spring to move the work-gripping element because the springs are extremely strong springs and once the movement by the spring is started, the force of the spring overcomes the control by the slide ring, and, as a result, the slide ring is subject to a "kick" when operated to allow the spring to move the work-gripping element and the jaws slam home to the position to which they are urged by the spring.

An important object of the present invention is to provide a new and improved chuck having an operating mechanism designed to provide more positive control of the clamping and releasing operation of the chuck than heretofore provided by known mechanisms.

Another object is to provide a new and improved chuck which has spring means effective to bias the chuck actuating mechanism in one direction and in which the linkage interconnecting the spring means and the movable work-gripping element of the chuck is so constructed and controlled that the spring has little or no tendency to kick or slam the mechanism to a particular position during the operation of the chuck actuating mechanism.

A further object of the present invention is to provide a jaw chuck in which the jaws having chuck open and chuck closed positions are operated by a toggle linkage actuated by a reciprocable actuator and wherein the toggle linkage is actuated to a substantially straight line position in opposition to a spring upon operation of the actuator in one direction and wherein means is provided to effect a breaking of the toggle linkage upon movement of the actuator in the opposite direction.

A still further object of the present invention is to provide a new and improved jaw-type chuck where the jaws are urged into engagement with the work by spring pressure but which is so constructed and arranged that the spring does not act on the jaws as they are moved to and from their work engaging position.

It is also an object to provide a new and improved chuck as in the preceding object in which the spring is maintained under a preload which is effective to bias the jaws only when the jaws engage the work and which is so constructed and arranged that the loading of the spring is approximately constant even if the operating mechanism for the jaws is effective to additionally load the jaws after the latter engage the work.

Referring to the drawings, which form a part of the present specification for all subject matter disclosed therein:

FIG. 10 is a fragmentary sectional view approximately along line 10—10 of FIG. 6;

FIG. 11 is a view corresponding to FIG. 10 but showing the parts in a different position;

Figure 1:
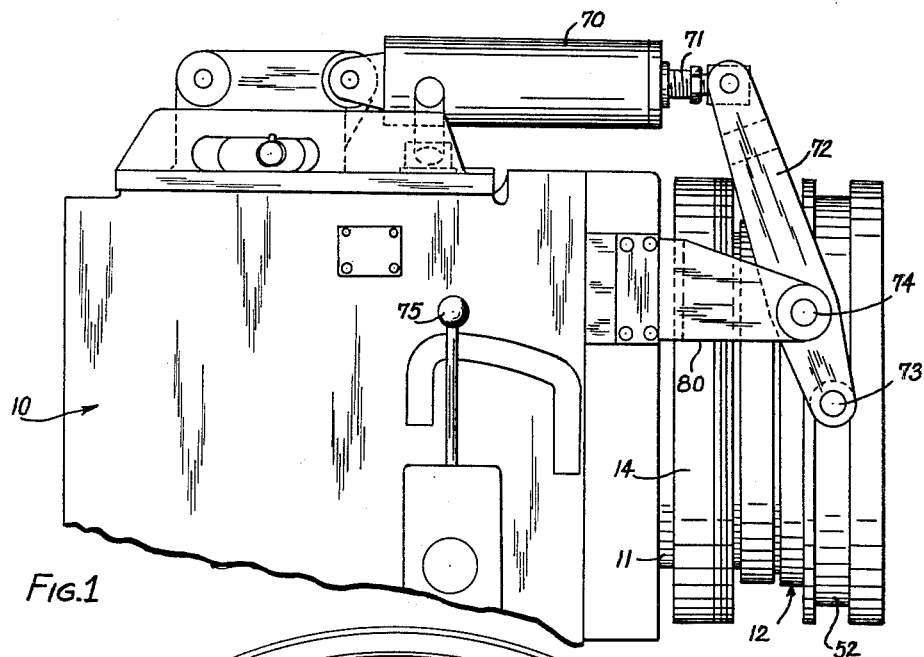
FIG. 1 is a fragmentary elevational view of a headstock having a chuck embodying the present invention mounted on the spindle thereof.
Figure 2:
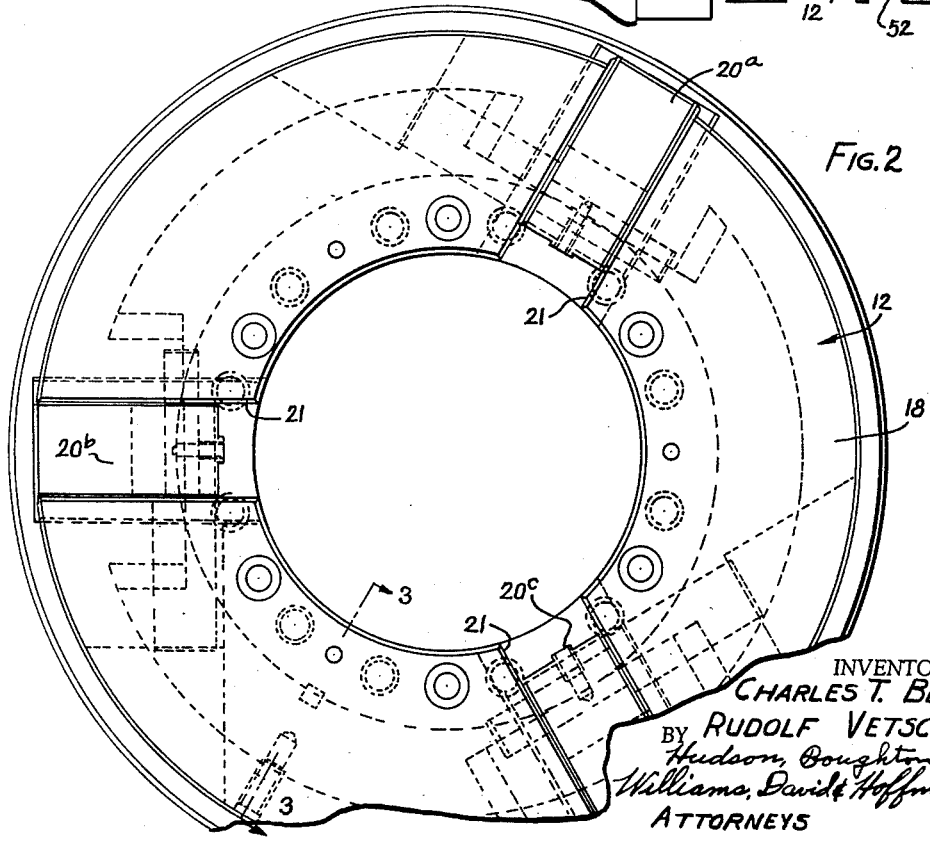
FIG. 2 is an end elevational view of the chuck of FIG. 1.

Referring to the drawings, a headstock 10 of a machine tool is shown in FIG. 1. A rotatable spindle 11 is rotatably supported by the headstock and a work-holding chuck 12 is fixed to the outer end of the spindle 11. The chuck 12 is adapted to grip and hold a workpiece to be rotated by the spindle 11 while a machine operation is performed thereon.

Figure 4:
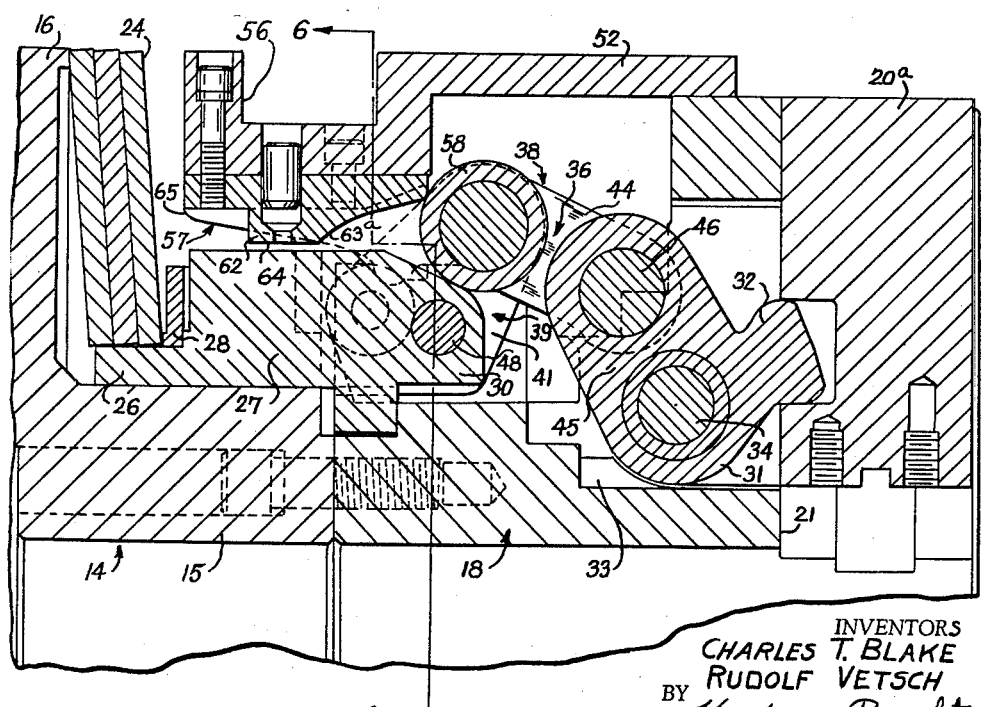
FIG. 4 is a fragmentary sectional view taken approximately along the line 4—4 of FIG. 3.

The work-holding chuck 12 includes an inner member 14 having a hub 15 and a radially extending flange 16 extending radially from the hub 15 and which is adapted to be secured to the end of the spindle 11 by any conventional means, not shown in the drawing and, per se, forming no part of the present invention. The hub 15 extends outwardly from the flange 16 coaxially with the spindle and an annular member 18 is bolted to the outer end of the hub 15, as indicated in FIG. 4. The annular member 18 supports three work-gripping jaws 20a, 20b, 20c which are disposed in radially extending cutouts 21 in the annular member 18. The cutouts 21 form a guideway for the work-gripping jaws 20 and the jaws and cutouts are spaced equidistantly around the annular member 18, i.e., 120° from each other. The work-gripping jaws 20a, 20b, 20c are reciprocated in the cutouts 21 to move radially inwardly to a chuck-closed position and radially outwardly to a chuck-open position. The jaws 21 each has a jaw face 22, FIGS. 10 and 11, fixed to the inner end thereof for engaging the work. It will be understood that if the chuck were designed to internally grip a hollow workpiece, the jaws would move radially outwardly to an open position, i.e., a work-gripping position.

The work-gripping jaws are subjected, in the preferred embodiment, to a spring bias when the jaws are in their chuck closed position divided by a plurality of Belleville, washer-type, springs 24 disposed about the hub 15 of the member 16 adjacent the flange portion 16. The Belleville springs 24 have an opening therethrough greater than the diameter of the hub 15 and rest on an annular projection 26 of a collar 27 slidable on the hub 15. The Belleville washers 24 tend to assume a position where their outer portion adjacent the outer periphery thereof engages the flange 16 adjacent the outer periphery thereof and their portions adjacent their inner diameter are deflected away from the flange portion 16 toward the collar 27. The inner periphery of the Belleville washers 24 engage an abutment ring 28 disposed on the projection 26 of the collar 27 and urge the collar 27 outwardly of the hub 15 toward the annular member 18. The collar 27 has an axially projecting ear 30 adjacent each of the jaws 20a, 20b, 20c. The ear 30 adjacent the jaw 20a is interconnected by a linkage 38 with a rocker member 31 having an arm 32 received in a recess in the inner side of the jaw 20a. The rocker member 31 is disposed in a cutout 33 in the annular member 18 and is supported for rocking movement by a pivot pin 34 extending between the walls of the cutout. When the rocker member 31 is rocked in a clockwise direction, as the latter is viewed in FIG. 4, the work-gripping jaw 20a is moved inwardly and when the rocker member 31 is rocked in a counterclockwise direction, the work-gripping jaw 20a is moved outwardly.

Figure 5:
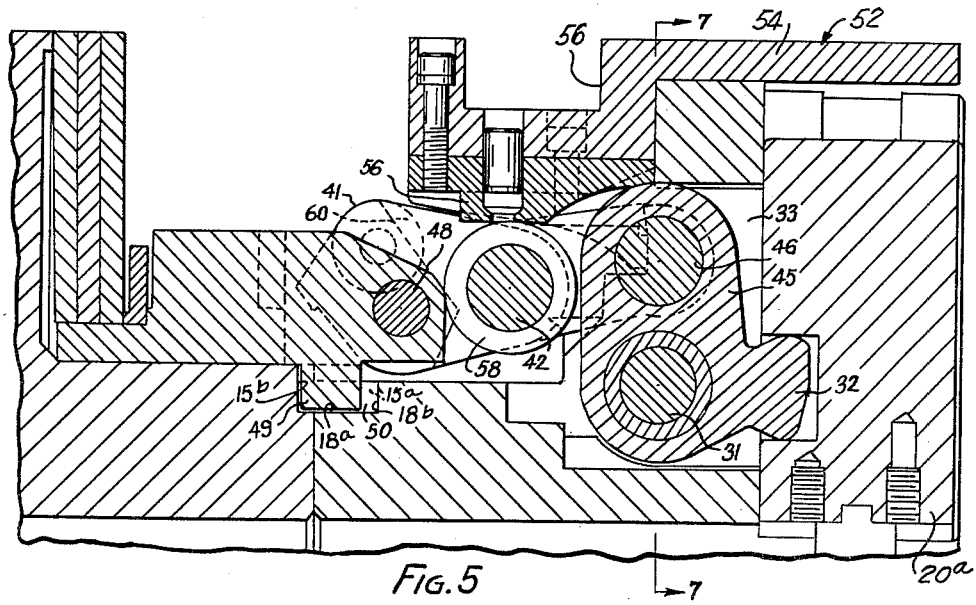
FIG. 5 is a fragmentary sectional view corresponding to FIG. 4, but showing the parts in their positions when the chuck is in its closed position.
Figure 6:
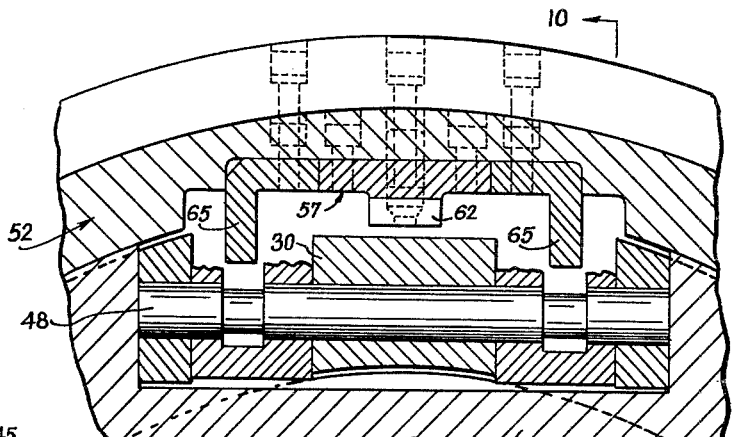
FIG. 6 is a fragmentary sectional view taken approximately along line 6—6 of FIG. 4.
Figure 7:
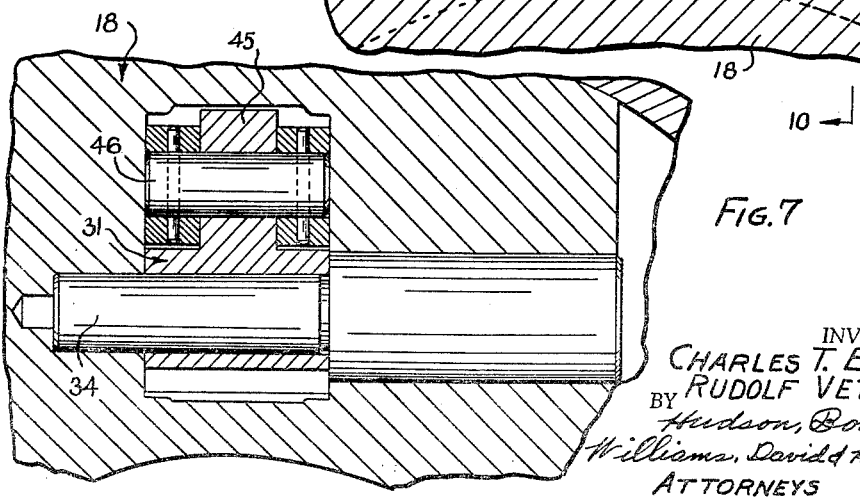
FIG. 7 is a fragmentary sectional view taken approximately along line 7—7 of FIG. 5.

The linkage 38 interconnecting the collar 27 and the rocker member 31 is a toggle linkage comprising a double toggle link 36 pivoted to the rocker member 31 and to a double toggle link 39 comprised of a pair of links 40, 41 by a pivot pin 42. The double link 36 is formed by a pair of link members 43, 44 which are disposed on opposite sides of an arm 45 of the rocker member 31 and are connected to the arm 45 by a pivot pin 46. The link members 40, 41 of the double link 39 are disposed adjacent the outer sides of the link members 43, 44, respectively, and each extends into a respective cutout 47 in the adjacent ear 30 of the collar 27 and the link members 40, 41 are pivoted to the ear by a pivot pin 48 extending through the ear and the cutouts and secured in the side walls of the cutouts 47. The double link 39 comprising the link members 40, 41 form one link of the toggle linkage 38, while the double link 36 comprising link members 43, 44 form a second link of the toggle linkage which interconnects the collar 27 and the rocker member 31. It can be seen that if the toggle linkage is moved toward a straight line position from its broken position shown in FIGS. 4 and 10, the toggle is straightened to move the pivot pins 46, 48 farther apart and the rocker member 31 clockwise about its axis, as the latter is viewed in FIGS. 4 and 5, to operate the work-gripping jaw 20a inwardly to a work-gripping position. The springs 24 will oppose movement of the collar 27 until the jaw 20a hits the workpiece, as is indicated in FIG. 11. Then the springs 24 will yield until the toggle links are moved to an approximate straight line position as shown in FIG. 5. If the toggle linkage is moved from its generally straight line position, shown in FIG. 5, to the broken position in FIG. 4, the pins 46, 48 move closer together and the rocker member 31 moves clockwise about its axis to move the work-gripping jaw 20a radially outwardly to a chuck-open position.

The collar 27 is provided with one or more lugs 49 which extend radially inwardly therefrom into an axially extending receiving opening 50 in an annular flange 15a extending axially outwardly from the outer end of the member 15 and received in an annular recess 18a in the adjacent end of the member 18 and providing an annular wall or shoulder 18b. The opening 50 extends inwardly from the outer end of the flange 15a and the bottom of the opening provides a wall 15b being in a radial plane. The springs 24 urge the collar 27 axially outwardly on the member 15 to a position where the lug 49 engages the wall 18b and holds the collar against the pressure of the springs.

Figure 14:
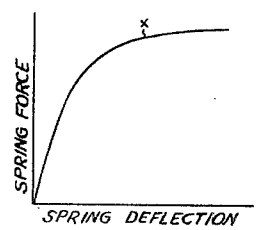
FIG. 14 is a graph showing spring loading as a function of deflection.

Preferably, the springs are under a preload when the collar 27 is in the position of FIG. 4 so that when they are further compressed, they will be operating over a generally flat portion of their characteristic curve to provide an approximately constant biasing force. A curve showing spring force as a function of compression appears as FIG. 14 and, preferably, the springs are preloaded to the point X when the lug 49 engages the wall 18b. The magnitude of the preloading may be adjusted by varying the thickness of ring 28 or shimming the ring. The movement of collar 27 to compress the spring is limited by the engagement of the lug 49 with the wall 15b and the lug engages the wall when the jaws are in their innermost work engaging position and the toggle linkage 38 is in a straight line position. This prevents the toggle from going through center which would move the pins 46, 48 toward each other.

From the foregoing description it will be understood that when the toggle linkage 38 is in the position of FIG. 4 and FIG. 10, the spring pressure is taken by the wall 18b and that the toggle linkage can be straightened without acting against the spring until the jaw 20a engages the workpiece which prevents further movement of pivot pin 46. Continued straightening of the linkage is then accomplished by moving the collar 27 away from the member 18 against the force of the springs 24. Since these springs have preferably been preloaded to the point X on the curve of FIG. 14, the force applied to the collar 27 is substantially constant for the movement of the collar. When the linkage is in a straight line or substantially a straight line position, there is little or no component of spring force tending to break the toggle linkage and substantially the full force of the spring is applied to the jaw 20a.

When the toggle linkage is broken to move the jaw 20a from its work-engaging position, the springs 24 first move the collar 27 to engage the lug 49 with the wall 18b thereby removing the spring pressure from the jaw 20a and continued breaking of the linkage then effects movement of the jaw 20a from its work-engaging position.

Figure 3:
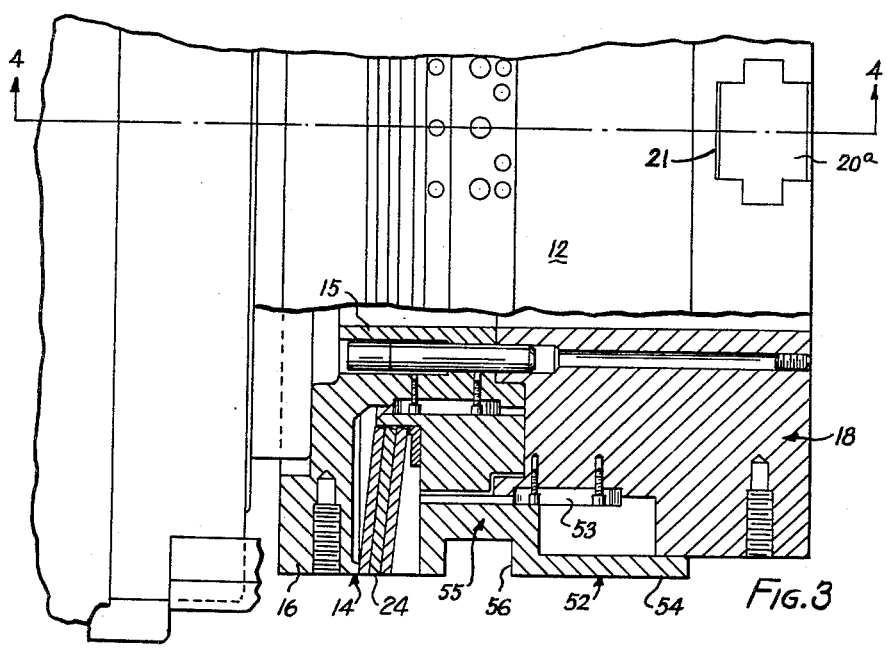
FIG. 3 is an enlarged view of a portion of FIG. 1 showing the work-holding chuck with a portion thereof cut away.

A chuck control member in the form of a sliding ring 52 is disposed about the members 14, 18 and is slidable axially in one direction to actuate the jaw 20a to a chuck-close position and in the other direction to a chuck-open position. The ring 52 slides on axially extending bearing members 53, best shown in FIG. 3, between the jaws 20a, 20b, 20c and bolted to a reduced portion of the annular member 18 adjacent its inner end. The ring 52 has a flange portion 54 which is adapted to slide over the outside periphery of the member 18 at its outer end and a portion 55 of greater thickness than the portion 52 and which slides on the members 53 and which has an annular recess 56 opening into the outside periphery thereof. The recess 56 is for purposes to be explained hereinafter.

Figure 8:
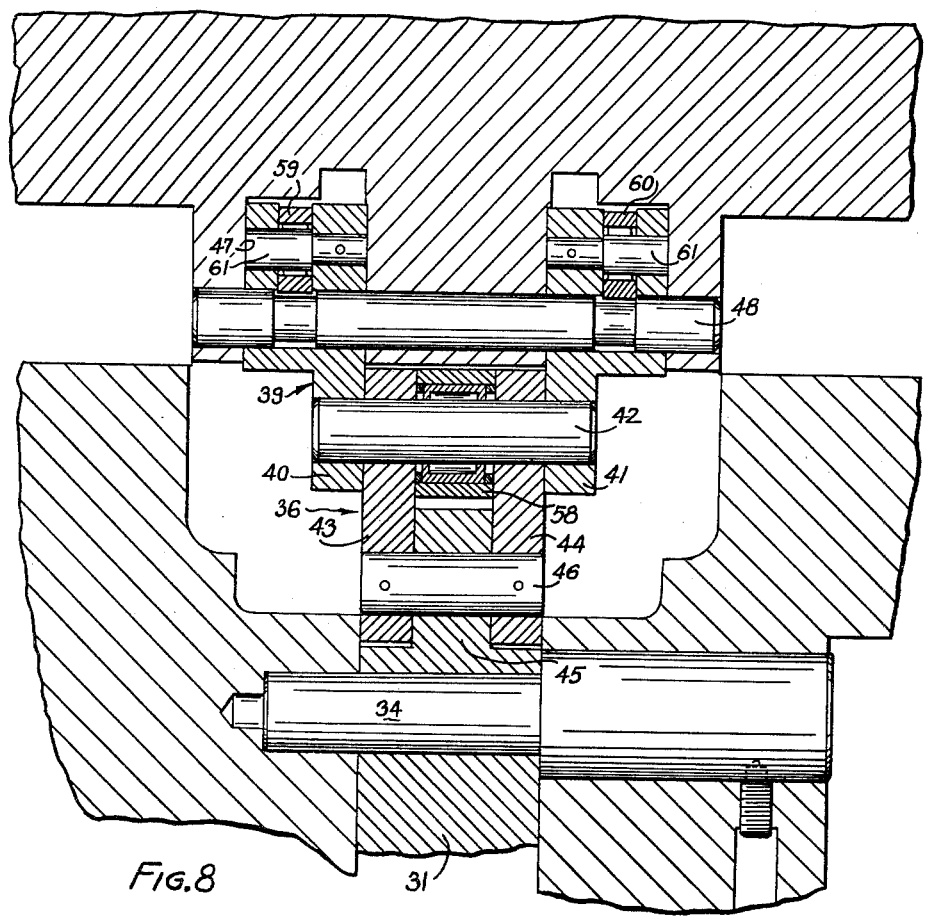
FIG. 8 is a developed view of a part of the linkage for operating one of the work-gripping elements of the chuck.
Figure 9:
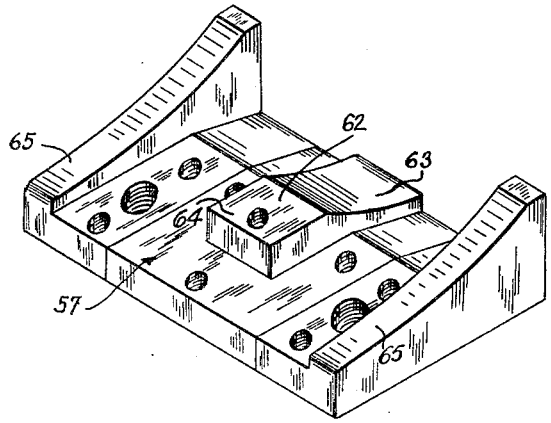
FIG. 9 is a perspective view showing a cam used to actuate and control the movement of one of the work-gripping elements.

A cam 57 is fixed to the inner side of the portion 55 of the ring 52 and is adapted to control the operation of the toggle linkage for rocking the rocker member 31. The cam 57 cooperates with a roller 58 fixed to the pin 42 between the link members 43, 44 and with rollers 59, 60 carried by the link members 40, 41, respectively. The link members 40, 41 have enlarged bifurcated end portions, as is best shown in FIG. 8, to provide arms between which the rollers 59, 60 are positioned and the rollers are supported by the arms by pivot pins 61 which extend through the arms and through the rollers.

The cam 57 is provided with a cam portion 62 which is adapted to engage the roller 58 when the ring 52 is moved axially outwardly on the member 18 to move the toggle linkage from the broken position shown in FIG. 4 to the straight line position shown in FIG. 5. The cam portion 62 includes a cam surface having a curved portion 63 and a straight portion 64 disposed inwardly of the curved portion 63. The curved portion 63 moves the roller 58 downwardly and the straight portion 64 holds the roller 58 in its straight line position. The cam 57 is also provided with cam portions 65 which are adapted to engage a respective one of the rollers 59, 60. The cam portions 65 are complemental to the cam portion 62 and operate the rollers 59, 60 when the ring 52 is moved from the position of FIG. 5 to the position of FIG. 4 to move the rollers 59, 60 downwardly, as the latter are viewed in FIGS. 4, 5 and 10 to move the link members 40, 41 counterclockwise about the pivot pin 48. The counterclockwise movement of the link members 40, 41 causes the movement of the toggle linkage to its broken position and the rocking movement of the rocker member 31 to a chuck-open position.

From the foregoing, it can be seen that when the slider ring 52 is moved outwardly, the cam portion 62 engages the roller 58 to operate the toggle linkage toward a straight line position to move the work-gripping jaw 20a to a chuck-close position, and when the slider ring is moved inwardly, the cam portions 65 cooperating with the rollers 59, 60 tend to move the linkage in the opposite direction to a broken position to operate the jaw 20a to a chuck-open position. When the cam portions 65 are acting as the actuating cams, the portion 62 is operating as control cam to control the slider ring. The cam surfaces are such that the ring will remain in an intermediate position as shown in FIG. 11.

The slider ring 52 is actuated by a fluid pressure actuator 70 mounted on the headstock 10 and having a piston rod 71 connected to one end of a lever 72. The other end of the lever 72 carries the roller 73 which is received in the recess 55 and the lever 72 is pivoted intermediate its ends by pivot pins 74 whereby operation of the actuator 70 will cause the reciprocation of the slider ring 52. The actuator 72 may be controlled by a control lever 75 on the headstock. The pivot pin 74 is carried by a bracket 80 fixed to the headstock 10.

It will be noted that the cam 57 can operate the toggle linkage 38 to a dead center position when the slider ring 52 is moved to the right, as viewed in FIGS. 4 and 5; with the toggle linkage in a dead center or an over center position, the toggle linkage functions to hold the jaw 20a in its closed position without the aid of the cam 57. When the jaw 20a is to be moved to its other position, the movement of the slider ring from the position of FIG. 5 to that of FIG. 4 will cause the cam surface 65 to engage the rollers 59, 60 and the rollers and the link 39 will be rocked about the pivot pin 48 to break the toggle linkage 38. As the toggle linkage breaks, the spring washers 24 will be effective to continue the breaking of the linkage as the slider 52 is moved rearwardly until the lug 49 engages the wall 18b and the cam 57 will complete the breaking of the linkage to move the jaw 20a from its work-engaging position. The provision of the complementary cams, therefore, which operate to move the linkage in its opposite directions upon movement of the slider 52 in opposite directions not only provides a more positive control of the movement in the direction in which the linkage is urged by the spring, but also allows the toggle linkage to be moved to a dead center position where it is not necessary for the cam to effect a holding of the linkage against the action of the spring washers 24.

The mechanism for operating the work-gripping jaw 20a between a chuck-open and a chuck-closed position has been described. It is to be understood that the elements 20b, 20c are actuated by similar mechanisms of the chuck which include a toggle linkage connected to the collar 27 and operated by a cam corresponding to the cam 57 carried by the slider ring 52.

Figure 12:
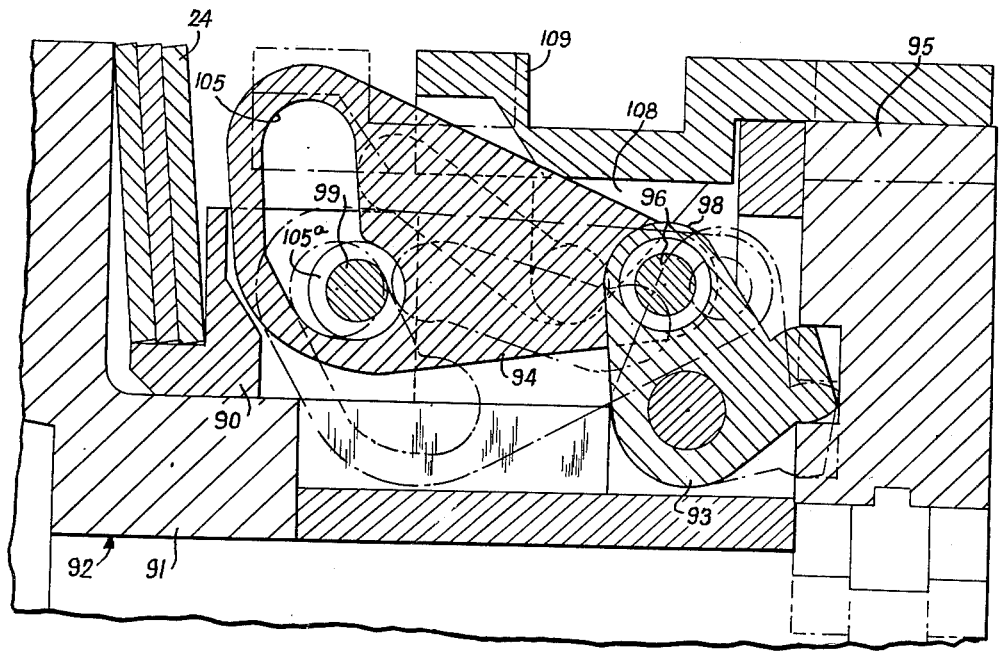
FIGS. 12 and 13 are fragmentary sectional views of a modification of the present invention.
Figure 13:
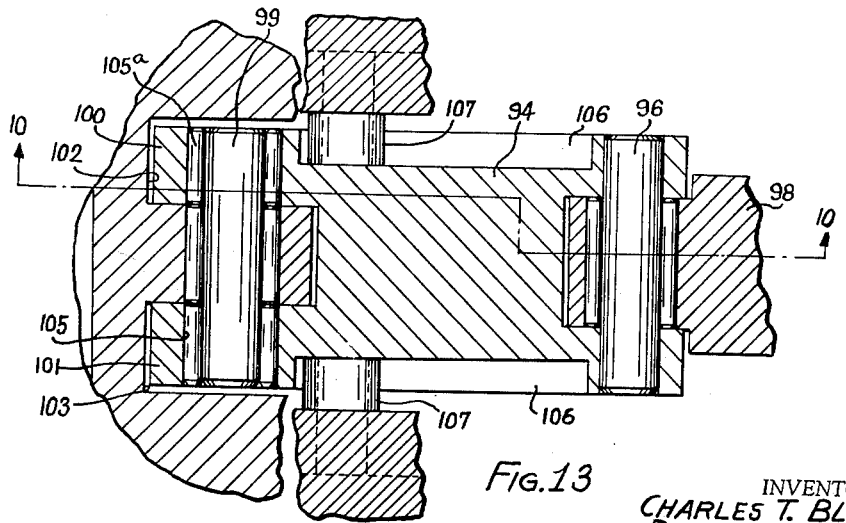

A modification of the present invention is shown in FIGS. 12 and 13. In this modification, a collar 90 is slidable on a hub 91 of a member 92 corresponding to the member 14 and is connected to a rocker member 93 corresponding to the rocker member 31 of the first-described embodiment by a toggle link 94. The collar 90 is urged toward the rocker member 93 by Belleville spring washers 24 and the rocking movement of the rocker member 93 operates a work-gripping jaw 95 which corresponds to the element 20a of the first-described embodiment.

The toggle link 94 is pivoted by a pin 96 to an arm 98 of the rocker member 93 and the end of the toggle link 94 adjacent the collar 90 is bifurcated to provide arms 100, 101 which are received in cutouts 102, 103 in the collar 90 and a pin 99 extends through the arms 100, 101 and the portion of the collar 90 between the cutouts 102, 103. The arms 100, 101 have slots 105 therein through which the pin passes and which allows relative movement between the pin and the toggle link 94. Rollers 15a are disposed on the pin 99 and ride in slots 105.

The opposite sides of the toggle link 94 each has a cam track 106 therein which receives a trunnion or cam 107 carried by a respective wall 108 extending inwardly from the inner side of a chuck control member, i.e., a slide ring 109, generally corresponding to the slide ring 52 of the first-described embodiment. The cam tracks 106 are such that when the slider ring 109 is moved rearwardly from the position shown in FIG. 12 where the rocker member 93 is in a position where the work-gripping element 95 is in its chuck-open position, the toggle link 94 is moved downwardly by the action of the cam tracks 106. When the slider ring 108 is moved as described, the cam 106 engages the lower side of the cam track 106, as the latter is viewed in FIG. 10, to move the toggle link 94 downwardly. The slots 105 which receive the pin are shaped to accommodate the downward movement of the toggle link and cause the toggle link 94 to move forwardly as the latter moves downwardly to move the work-gripping jaw 95 to a chuck-close, or work-engaging, position.

When the slider ring 109 is moved in the opposite direction, the upper side surfaces of the tracks 106 cooperate with the cams or trunnions to rock the rocker member 93 counterclockwise to actuate the work-gripping jaw 95 to its chuck-open position clear of the workpiece.

It can be seen that the cam tracks 106 provide upper and lower surfaces which cooperate with the cams 107 and the upper surface effects a raising of the toggle link 94 and the most left-hand side of the cam track or slot 105 receiving the pin 99 moves the toggle link forwardly when the slider ring is moved to the position shown in FIG. 12, while the cam 107 moves the link 94 downwardly when the slider ring is moved rearwardly.

It is to be understood that the chuck of FIG. 12 includes a plurality of jaws 95 operated by links 94 connected between the collar 90 and the corresponding jaws.

The described linkage and means for operating the linkage of the disclosed chuck provides a mechanism such that the Belleville springs do not function to slam the work-gripping jaws to their open position. The slider ring 52 is always effective to control the movements of the work-gripping element, in spite of the fact that the Belleville springs 24 are extremely heavy springs.

It can now be seen that the present invention provides a new and improved chuck mechanism and while the preferred embodiment has been described in considerable detail, further modifications, constructions, and arrangements will fall within the ability of those skilled in the art and it is hereby my intention to cover all such constructions, arrangements, and modifications which fall within the scope and spirit of the present invention.

Having thus described our invention, we claim:

1. A chuck comprising a rocker member rockable about an axis to rock a work-gripping jaw between a work-gripping and work-releasing positions, a reciprocable member, link means extending transversely of said axis and connecting said reciprocable member to said rocker member including pivotal connections connecting said link means to said members, said link means comprising a toggle link pivotally connected to said rocker member and movable in directions toward and away from a dead center position to respectively lengthen and shorten the effective length of said link means between said connections, the movement of said link effecting a rocking of said rocker member when said reciprocable member is held against movement, a chuck control member, means supporting said chuck control member adjacent said link means for reciprocation relative thereto, cam means on said control member, cam follower means on said link means and engaged by said cam means to move said toggle link in one of its said directions with respect to its dead center position when said control member is moved in one direction, a spring means for yieldably opposing movement of said reciprocable member due to the force applied to said reciprocable member by movement of said link by said cam means, said reciprocable member and spring means yielding when said rocker member is held and said link means moved by said cam means, and means independent of said spring means for actuating and controlling the movement of said toggle link in a direction opposite to its said one direction upon reciprocation of said control member in a direction opposite to its said one direction.

2. A chuck as defined in claim 1 wherein said link means comprises said toggle link and a second toggle link disposed in end-to-end relationship and having their adjacent ends pivotally connected.

3. A chuck comprising a rocker member rockable about an axis to move a work-gripping jaw between a work-gripping and work-releasing positions, a reciprocable member, link means connecting said reciprocable member to said rocker member including pivotal connections connecting said link means to each of said members, said link means comprising a toggle link pivoted to one of said members and movable from a toggle broken position toward a straight-line position to lengthen the effective distance between said connections and in the opposite direction to shorten the distance, whereby said rocker member is rockable in opposite directions upon the reciprocation of said toggle link to and from a straight-line position and the holding of said reciprocable member, a chuck control member, means supporting said chuck control member adjacent said toggle link for reciprocation relative thereto, first and second cam means on said control member, cam follower means on said toggle link and engageable by said first and second cam means respectively for moving and controlling the movement of said toggle link in opposite directions toward and from said toggle broken position upon reciprocation of said control member, spring means yieldably opposing movement upon movement of said link by one of said cam means and yieldable to allow movement of said reciprocable member by said one cam means when said rocker member is held.

4. A chuck as defined in claim 3 wherein said first and second cam means on said control member and said cam follower means comprises a cam track and a cam follower received in said cam track, one side of said cam track constituting said first cam means and the other side of said cam track constituting said second cam means.

5. A chuck as defined in claim 3 wherein said cam follower means comprises a respective cam follower for each of said cam means and said followers being disposed on the opposite sides of the pivotal connection of said toggle link to the one of said members to which the link is pivoted, whereby forces in the same direction tend to move the link in opposite directions about its pivot to the one of said members to which it is connected.

6. A chuck comprising a rocker member rockable about an axis to move a work-gripping jaw between a work-gripping and work-releasing positions, a reciprocable member, a pair of toggle links disposed in end-to-end relationship, pivot means pivotally connecting the adjacent ends of said links, second pivotal connections connecting the other ends of said links to said members respectively, said links being movable from a toggle broken position toward a dead center position to lengthen the distance between said second pivotal connections and toward the broken position to shorten the distance, a chuck control member, means supporting said chuck control member adjacent said toggle links for reciprocation relative thereto, cam means carried by said control member, cam follower means carried by one of said toggle links and engaged by said cam means to move said one of said toggle links in opposite directions about its pivotal connection to the respective one of said members upon reciprocation of said clutch control member to respectively move said one of said links toward and from toggle broken position, and a spring yieldably opposing movement of said reciprocable member in one direction and operable to urge said toggle links in one direction with respect to their toggle broken position.

7. A chuck as defined in claim 5 wherein said cam means comprises first and second complemental cams and said cam follower means comprises first and second followers cooperating with respective ones of said cams and disposed on opposite sides of the pivotal connection of said one toggle link to the member to which it is connected.

8. A chuck comprising a work-gripping jaw, having a work-gripping position and a retracted position, a first member supporting said work-gripping jaw for reciprocatory movement between said positions, actuating means operatively connected to said work-gripping jaw and operable in first and second directions respectively for moving the latter between said work-gripping and retracted positions, said actuating means including a reaction member having a first position in which said actuating means has a stroke greater than necessary to move said jaw between said positions, a spring urging said reaction member in a first direction to oppose the forces applied to the reaction member when said work-gripping jaw is held and said actuating means operated in its said first direction and effective to apply a predetermined force to said reaction member when it is in its said first position, means supporting said reaction member for movement from its said first position in opposition to said spring and return, and abutment means engageable with said reaction member to limit the movement of said reaction member in its said first direction to its said first position and taking the force of said spring when the reaction member is in its said first position.

9. A chuck as defined in claim 8 wherein said actuating means comprises a toggle linkage connected between said reaction member and said work-gripping jaw.

10. A chuck as defined in claim 8 wherein said actuating means comprises a toggle linkage connected between said reaction member and said work-gripping jaw and said actuating means includes complementary cam means reciprocable lengthwise of said toggle linkage and engageable therewith to actuate said linkage in said first and second directions respectively.

11. A chuck as defined in claim 9 wherein the movement of said toggle linkage toward a straight line position actuates said work-gripping jaw to its said work-gripping position and said spring is preloaded to a substantially flat portion of its characteristic curve with said reaction member in its said first position.

12. A chuck as defined in claim 11 wherein said actuating means includes complementary cam means reciprocable lengthwise of said toggle linkage and engageable therewith to actuate the latter to and from a generally straight line position.

13. A chuck as defined in claim 8 wherein said actuating means comprises a toggle linkage connected between said reaction member and said work-gripping jaw and movable toward and from a generally straight-line position to actuate said work-gripping jaw to a work-gripping position and to a work-releasing position.

14. A chuck as defined in claim 9 wherein said toggle linkage has a straight-line position connecting said reaction member and said work-gripping jaw and said spring acts on said reaction member and urges it along the straight-line position of the linkage to urge the linkage to a broken position once said linkage has been moved from a straight-line position, said actuating means further including means for actuating said linkage to a straight-line position and moving said reciprocating member against said spring, and means for actuating said linkage from a straight-line position toward a broken position.

15. A chuck comprising a rocker member rockable about an axis to rock a work-gripping jaw between a work-gripping position and work-releasing position, a reciprocable member having a first position when said jaw is in its said work-gripping position, link means extending transversely of said axis and connecting said reciprocable member to said rocker member including pivotal connections connecting said link means to said members, said link means comprising a toggle linkage pivotally connected to said rocker member and having a broken position interconnecting said reciprocable member and said rocker member when said jaw is in a work-releasing position and movable from said broken position to a straight-line position between said reciprocable member and said rocker member, the length of said linkage being such that when in its said straight-line position, the distance between said reciprocable member when the latter is in its said first position and said rocker member when it is in a work-gripping position is shorter than the length of said linkage, means supporting said reciprocable member for movement away from and return to said first position and in a direction which is an extension of the straight-line position of said linkage, a spring acting on said reciprocable member and yieldably opposing movement of said reciprocable member from its said first position and urging said member toward its said first position when displaced therefrom, a control member adjacent said linkage and including means for moving said linkage from a broken position toward said straight-line position to lengthen said toggle linkage and means for actuating said toggle linkage from a generally straight-line position toward a toggle broken position to break the toggle and allow said spring to move said linkage to its said broken position.

References Cited in the file of this patent
UNITED STATES PATENTS

| | | |
|---|---|---|
| 1,813,705 | Lewis | July 7, 1931 |
| 2,455,663 | Eaton | Dec. 7, 1948 |